(12) United States Patent
Garcia

(10) Patent No.: US 11,412,707 B1
(45) Date of Patent: Aug. 16, 2022

(54) FOOD AND WATER DISPENSING SYSTEM

(71) Applicant: Noel Garcia, Hialeah, FL (US)

(72) Inventor: Noel Garcia, Hialeah, FL (US)

( * ) Notice: Subject to any disclaimer, the term of this patent is extended or adjusted under 35 U.S.C. 154(b) by 161 days.

(21) Appl. No.: 16/752,832

(22) Filed: Jan. 27, 2020

(51) Int. Cl.
| | |
|---|---|
| A01K 7/04 | (2006.01) |
| A01K 7/00 | (2006.01) |
| A01K 5/02 | (2006.01) |
| A01K 7/02 | (2006.01) |

(52) U.S. Cl.
CPC .............. *A01K 7/04* (2013.01); *A01K 5/0225* (2013.01); *A01K 7/005* (2013.01); *A01K 7/022* (2013.01)

(58) Field of Classification Search
CPC ........ A01K 7/04; A01K 7/005; A01K 5/0225; A01K 5/0135; A01K 1/03
See application file for complete search history.

(56) References Cited

U.S. PATENT DOCUMENTS

| | | | | |
|---|---|---|---|---|
| 8,656,862 | B2* | 2/2014 | Manickchan | A01K 5/0291 119/51.11 |
| 8,863,696 | B1* | 10/2014 | Lee | A01K 1/0356 119/482 |
| 2004/0083772 | A1* | 5/2004 | Gaines | D06F 25/00 68/19 |
| 2004/0200030 | A1* | 10/2004 | Baer | A47L 7/0014 15/353 |
| 2006/0185068 | A1* | 8/2006 | Halloran | E03D 1/306 4/378 |
| 2006/0236952 | A1* | 10/2006 | King | A01K 1/03 119/499 |
| 2009/0223463 | A1* | 9/2009 | Chem | A01K 7/06 119/482 |
| 2009/0272279 | A1* | 11/2009 | Kieck | A47J 47/10 99/468 |
| 2010/0148645 | A1* | 6/2010 | Harper | A01K 5/0114 312/237 |
| 2017/0245465 | A1* | 8/2017 | Oates | A01K 7/00 |
| 2018/0065839 | A1* | 3/2018 | Hogshead | F16K 21/18 |

* cited by examiner

*Primary Examiner* — David J Parsley
(74) *Attorney, Agent, or Firm* — Sanchelima & Associates, P.A.; Christian Sanchelima; Jesus Sanchelima

(57) ABSTRACT

A food and water dispensing assembly for pets including a food dispensing assembly, a water dispensing assembly, a storage assembly and a water draining assembly is disclosed. The food dispensing assembly holds and stores food. It continuously dispenses food in order to avoid food supplies getting low. The water dispensing assembly holds and stores water. It continuously dispenses water in order to avoid water levels ever declining. Thereby allowing the pet to be fed and provided water even when unsupervised. The water draining assembly is essential as it prevents overflow of water from the water assembly to ever occur. Any overflow of water in the system is disposed of through the water draining assembly, which aids in avoiding water damage that may result from water overflow due to a structural failure of the water dispensing system or otherwise. The water draining assembly is crucial to prevent emergency situations from arising.

17 Claims, 8 Drawing Sheets

FOOD AND WATER DISPENSING SYSTEM

BACKGROUND OF THE INVENTION

1. Field of the Invention

The present invention relates to a food and water dispensing system and, more particularly, to a food and water dispensing system that is capable of dispensing food and water to a pet even when an owner is away that importantly includes a drain used in emergencies to avoid overflow of water and flooding should there be a structural failure in the system.

2. Description of the Related Art

Several designs for food and water dispensing systems have been designed in the past. None of them, however, include a drainage system that activates in situations in which there is an overflow or overfill of water due to a structural failure of some sort. There is often a need to leave pets unsupervised as the pet owners have duties such as work, chores or other commitments that must be completed while away from home. Still yet, even when away from home, the pet owners must provide necessities to their pets such as food and water. Hence, there is a need for a dispensing system that automatically provides food and water to pets. There are situations in which failure of components or structures may occur. There may be situations in which the structural failure of the system or coacting components are to the water dispensing component of the present invention. This becomes an emergency situation as an overfill or overflow of water can be very damaging to the surrounding areas in which the present invention may be located. The overfill and overflow of water also leads to costly repairs. With the water draining system of the present invention, this situation is entirely avoided, and pet owners can rest assured that even unsupervised their pets will be fed, and no costly water damage repairs may be needed as a result of the feeding system breaking down. Hence, there is a need for a food and water dispensing system for pets that guards and protects against water overflow situations.

Applicant believes that a related reference corresponds to U.S. Pat. No. 8,656,862 issued to Navin Manickchan et al. for Automatic Animal Feeding and Watering Device. It is a device for catering to the dietary needs of animals. Food is stored in a hopper and distributed at intervals to the animal's feeding receptacle via an internal dispensing mechanism using a flexible rotor sealing against the walls of a housing to both meter the food and seal against contamination. The quantities and delivery times may be set by the user. An optional weighing system can be provided to increase the accuracy of delivered food amounts. Optionally, the device may include a water delivery system. A pump is utilized to change the water several times a day, in an attempt to remove the contaminants that may affect the quality of the water. However, it differs from the present invention because the Manickchan et al reference is less intuitive. The water system is refilled in a manner that does not use a flush system to regulate the amount of water to be dispensed. Additionally, the present invention includes a drain that may help to alleviate the overflowing or overfilling of water due to structural damage, that helps to avoid costly water damage.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a food and water dispensing system that automatically provides food and water to a pet.

It is another object of this invention to provide a food and water dispensing system that includes a drainage system to avoid an overflow of water which would otherwise lead to water damage due to the water dispensing system having a failure occur.

It is still another object of the present invention to provide a food and water dispensing system that includes amenities to increase the comfort levels of a pet, such as a roof for shade and a fan.

It is another object of the present invention to provide a food and water dispensing system that includes storage means for items other than food and water.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
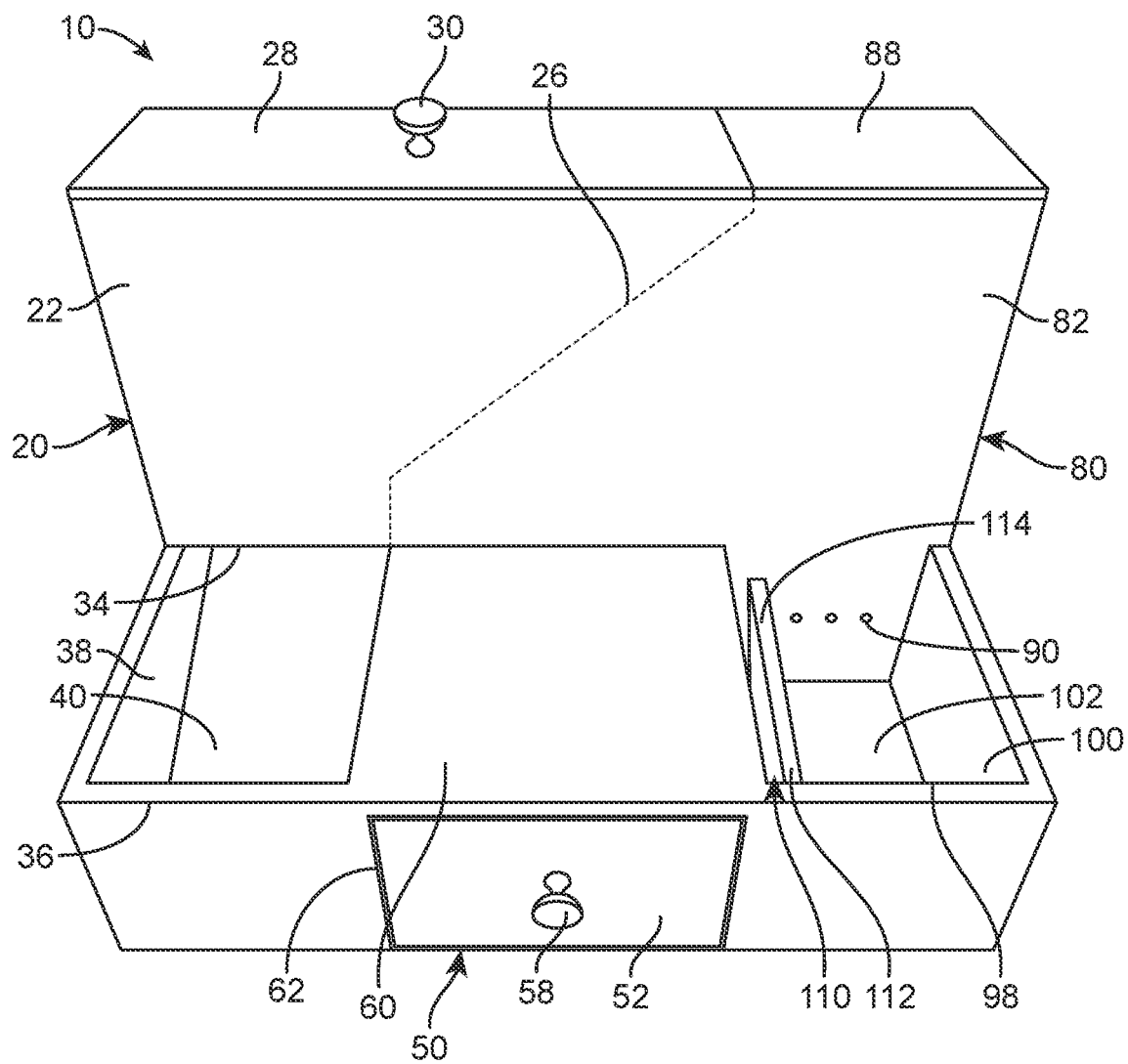
FIG. 1 represents an isometric view of the present invention.

Referring now to the drawings, where the present invention is generally referred to with numeral 10, it, a food and water dispensing system 10, can be observed that it basically includes a food dispensing assembly 20, a storage assembly 50, a water dispensing assembly 80, and a draining assembly 110.

Figure 2:
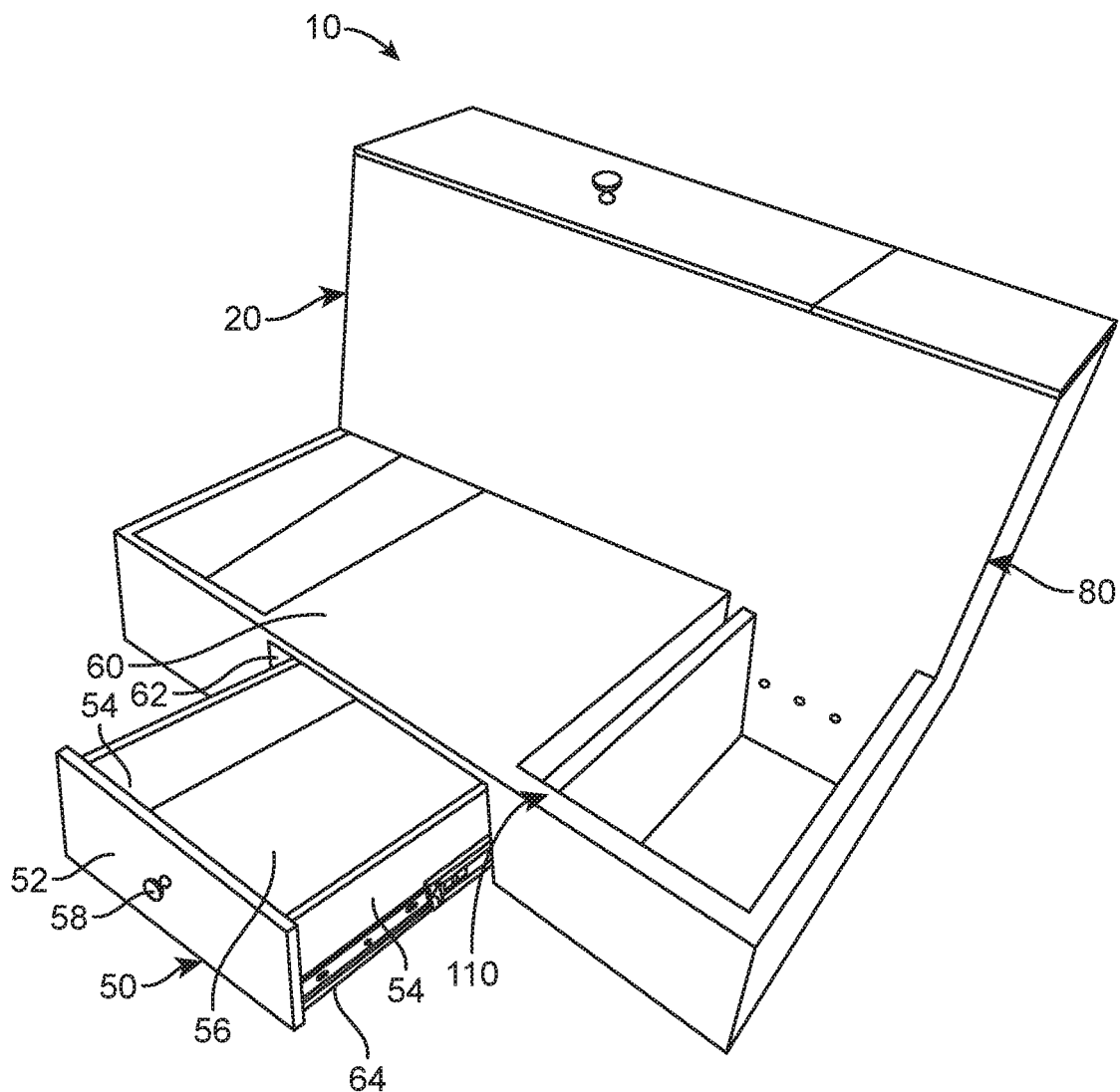
FIG. 2 is a view of the storage assembly of the present invention opened.
Figure 3:
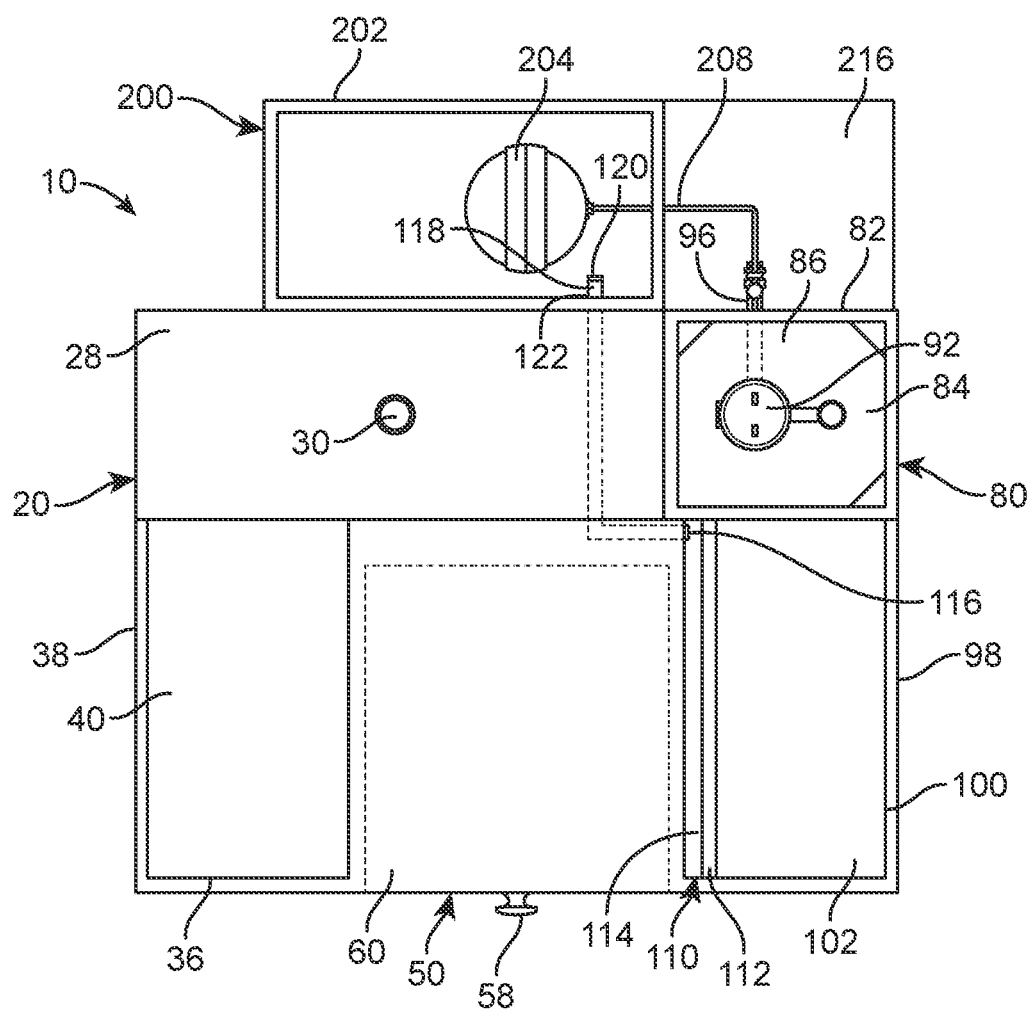
FIG. 3 shows the inside of the water storage of the water dispensing assembly of the present invention.
Figure 4:
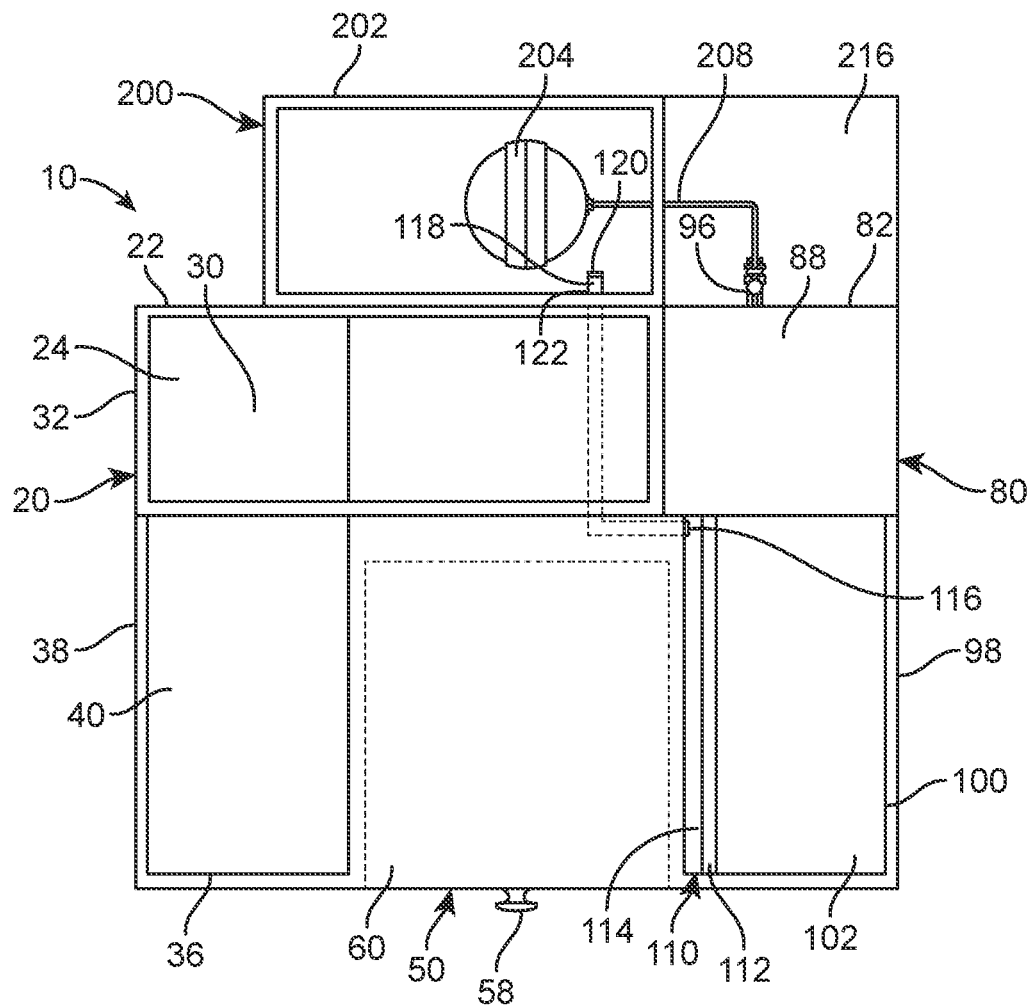
FIG. 4 shows the inside of the food storage of the food dispensing assembly of the present invention.
Figure 5:
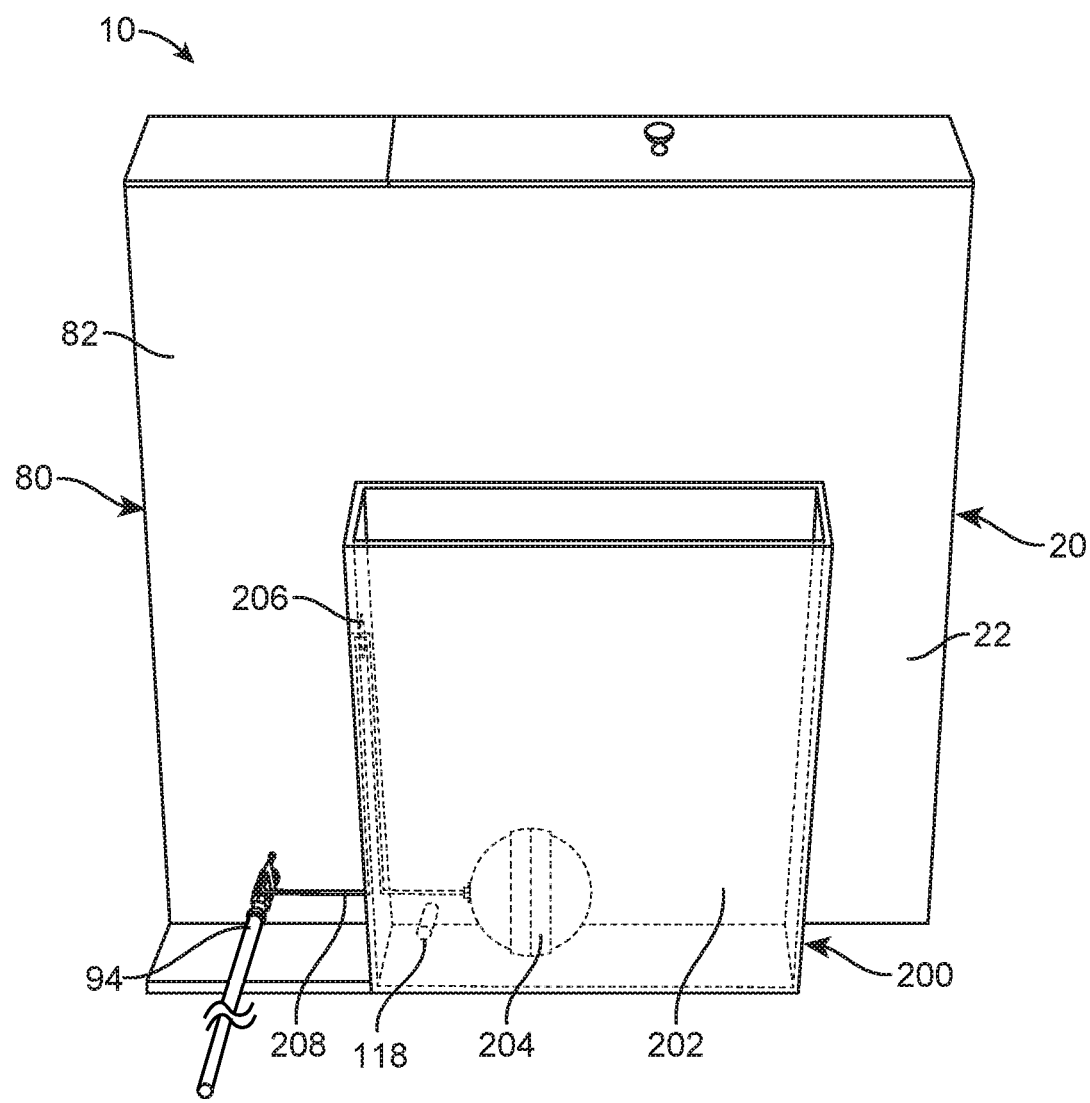
FIG. 5 represents a back view of the present invention to show the reservoir assembly.
Figure 6:
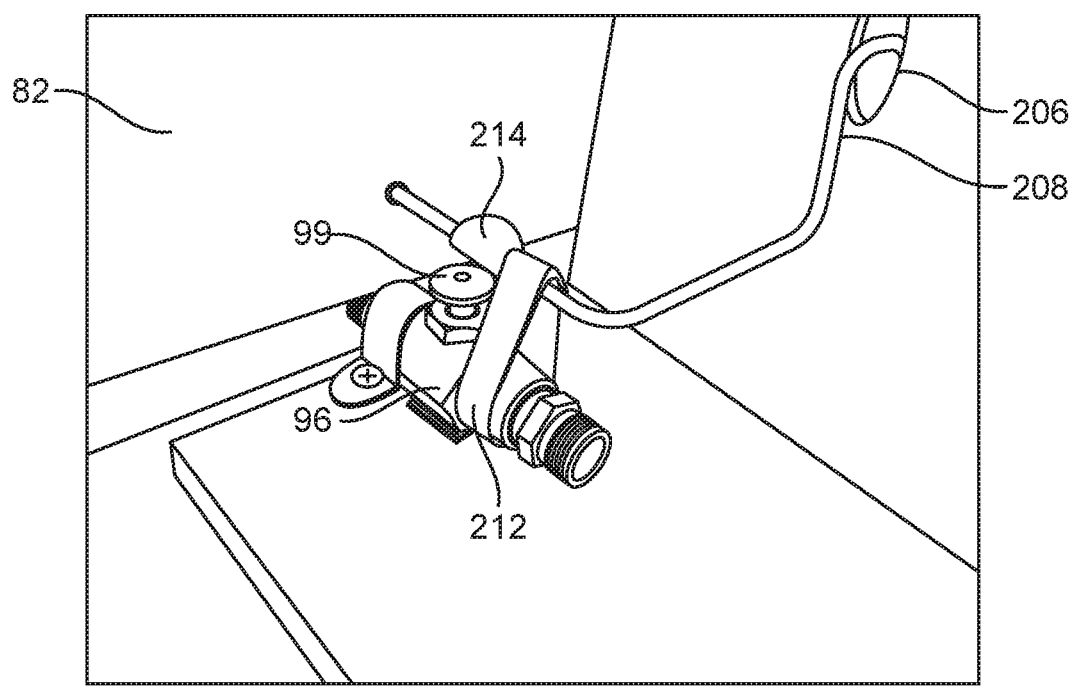
FIG. 6 shows a zoomed in view of the valve working with the float rod and the stopper.
Figure 7:
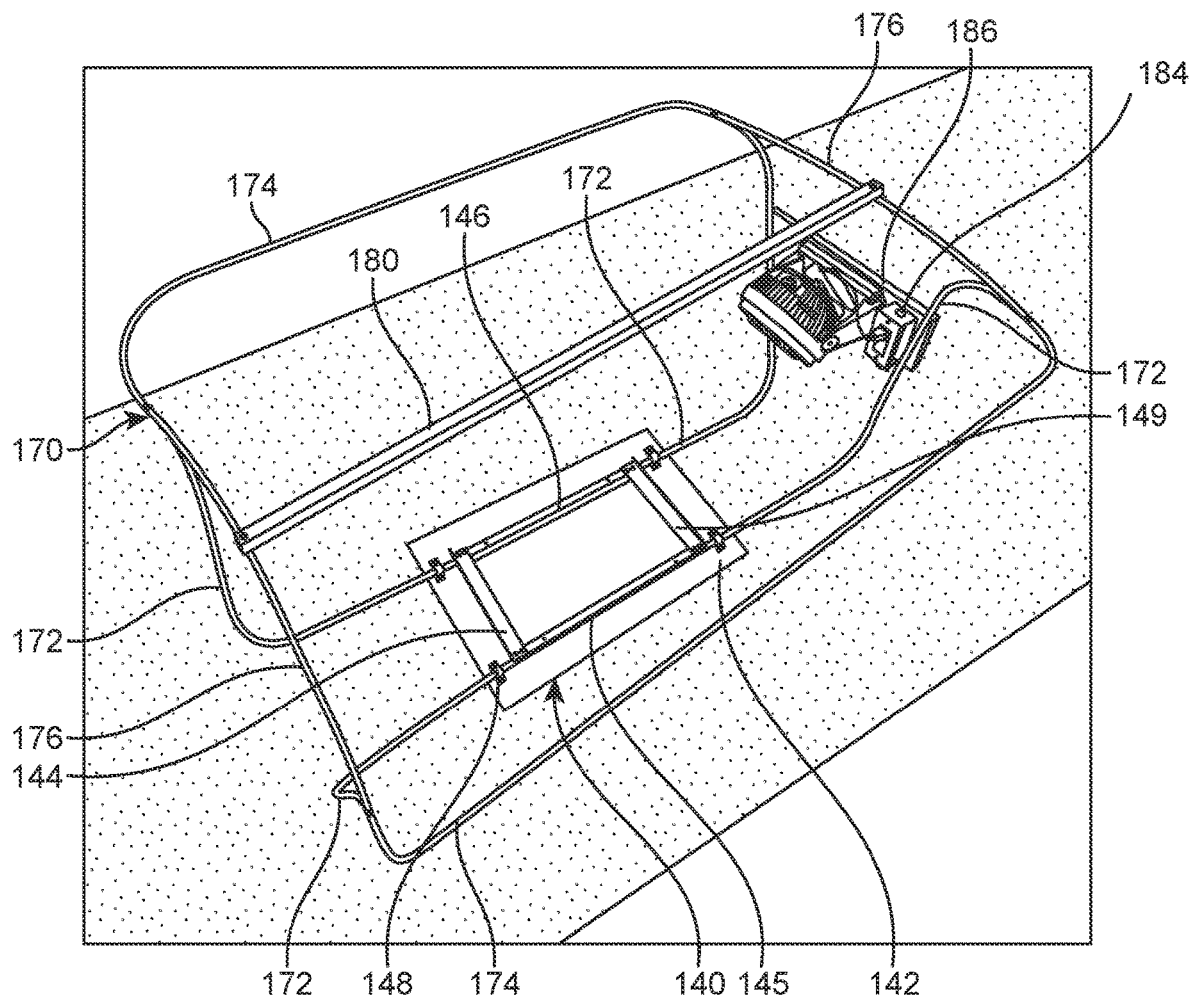
FIG. 7 shows the base assembly and roof assembly of the present invention.
Figure 8:
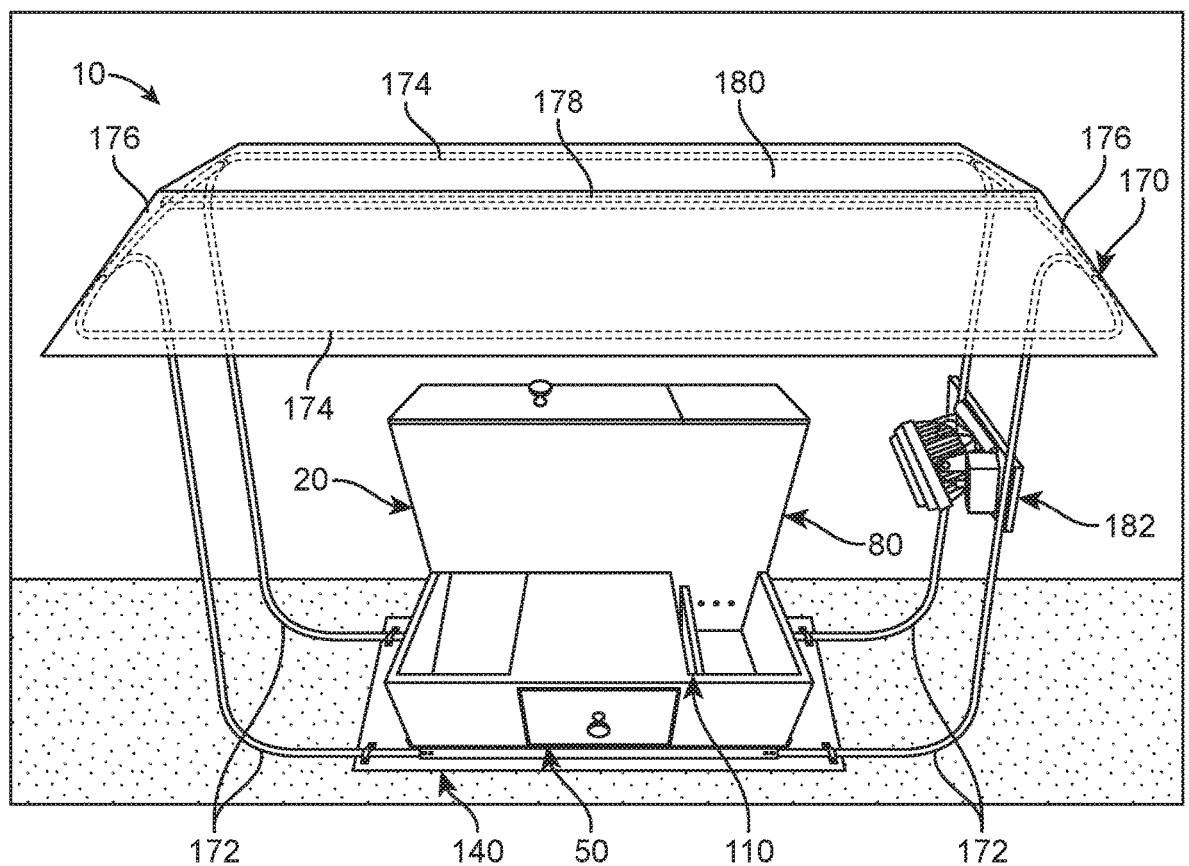
FIG. 8 represents the present invention entirely assembled.

Referring to FIGS. 1-8 the present invention, food and water dispensing system 10 can be seen. It can be seen that food dispensing assembly 20 is on a left side of the present invention. It may be suitable for food dispensing assembly 20 to instead be on a right side of the present invention in an alternate embodiment. Food dispensing assembly 20 includes a food storage 22. Food storage 22 is adapted to hold pet food F therein, preferably dry pet food. Any other consume food may be suitable to store and dispense through food storage 22. Food storage 22 is of a predetermined dimension and shape that may be changed as per the needs of a user. Food storage 22 has sidewalls that make and determine the shape of food storage 22. There may be a need to use more or less sidewalls for food storage 22 depending on the shape food storage 22 may be. Food storage 22 may include a food storage interior 24. Food storage interior 24 is accessed through a food storage top opening 32. Food storage top opening 32 may be uncovered when food storage 22 needs to be refilled when pet food F has fallen below a predetermined threshold. Otherwise, food storage 22 and more specifically, food storage interior 24, may be covered by a food storage lid 28. Food storage lid 28 is removably attached to food storage 22. Preferably, food storage lid 28 is of a shape that cooperates with food storage top opening 32. Food storage top opening 32 is covered by food storage lid 28. Food storage lid 28 may be lifted from food storage 22 through the use of food storage handle 30. Food storage handle 30 may be in the shape of a knob. It may be suitable for food storage handle 30 to be of virtually any shape, permitting that a user can grab food storage handle 30 to lift food storage lid 28. In the immediate embodiment, food storage handle 30 may include a handle shaft extending upwardly from food storage lid 28. It may be suitable for the handle shaft to be entirely of an equal diameter, or it may taper outwardly as it extends from food storage lid 28 and it may also be suitable for handle shaft to taper inwardly as it extends from food storage lid 28. Atop of the handle shaft of food storage handle 30 may be a handle top portion mounted thereon which may be circular in shape. However, it should be understood that virtually any shape may be suitable for the handle top portion. Therein food storage interior 24 is where pet food F may be received and stored. Further seen within food storage interior 24 may be seen a food storage slope 26. Food storage slope 26 may, in an alternate embodiment, slope more or less depending on the needs of the user. Food storage slope 26 may be adapted to guide pet food F held therein food storage interior 24 towards a food storage bottom opening 34. Pet food F is dispensed therefrom food storage interior 24, more specifically, pet food F is dispensed through food storage bottom opening 34 and into a food bowl 36.

Food bowl 36 is where pet food F may be dispensed into in order for a pet to consume pet food F freely until all pet food F is consumed. Food bowl 36 may include food bowl sidewalls 38 and a food bowl bottom surface 40. Food bowl sidewalls 38 may extend upwardly from food bowl bottom surface 40. It should be understood that food bowl 36 may be of virtually any predetermined shape. It also be understood that food bowl 36 may be of predetermined dimensions as per the needs of a user. Food bowl sidewalls 38 may be of predetermined dimension as per the needs of a user as well. It should be understood that any number of food bowl sidewalls 38 may be suitable for the present invention. Food bowl sidewalls 38 create an enclosed perimeter for pet food F to held therein. In the immediate embodiment of the present invention, food bowl bottom surface 40 may be inclined or sloping. In an alternate embodiment, it may be possible for food bowl bottom surface 40 to be flat. Any material may be suitable for food dispensing assembly 20 such as plastic, metal, aluminum, wood, steel or the like and combinations thereof.

Adjacent to food bowl 36 of food dispensing assembly 20 may be a storage assembly 50. In an alternate embodiment, storage assembly 50 may be adjacent to water dispensing assembly 80. Storage assembly 50 may be used to store additional pet items such as pet waste bags, leashes, toys, harness etc. Virtually any item that fits inside of storage assembly 50 may be stored in storage assembly 50. Storage assembly 50 may include a drawer 52 to hold items therein for safe keeping. Drawer 52 may slide in and out of a designated opening or slot, better known as a drawer slot 62 in the present invention. The movement of drawer 52 in and out of drawer slot 62 is achieved through rails 64. Drawer 52 may include drawer sidewalls 54 and a drawer bottom surface 56. Drawer sidewalls 54 may extend about a perimeter of drawer 52. Drawer sidewalls 54 extend upwardly from drawer bottom surface 56. It should be understood that any number of drawer sidewalls 54 may be suitable depending on the shape of drawer 52. Thereon drawer bottom surface 56 is where items are received. It should be understood that drawer sidewalls 54 and drawer bottom surface 56 may be of predetermined shapes and dimensions as per the needs of a user. Thereby meaning that drawer 52 may also be of a predetermined shape and dimension. Drawer 52 may also have an open top. When drawer 52 is within drawer slot 62 the open top of drawer 52 may be covered by a drawer top portion 60 of the storage assembly 50. One of drawer sidewalls 54 may have a drawer handle 58 mounted thereon. Drawer handle 58 may be adapted to allow a user to pull or push drawer 52 from drawer slot 62. Thereby, meaning that drawer 52 may have an open and closed configuration. In an open configuration, drawer 52 is slid out from drawer slot 62. When drawer 52 is in a closed configuration, one of drawer sidewalls 54 with drawer handle 58 mounted thereon may be flush with the surrounding surfaces. Drawer top portion 60 may cover and protect all items held therein drawer 52 when in a closed configuration.

Food and water dispensing system 10 may further include water dispensing assembly 80. Water dispensing assembly 80 is intended to continuously dispense water W to provide drinking water to a pet. Water W is continuously replenished in order to prevent water levels from ever declining beyond a predetermined threshold. Water dispensing assembly 80 may include a water storage 82 adapted to hold and store water W for dispensing that is to be drinking water for a pet. It should be understood that water storage 82 may be of any predetermined shape or dimensions. Thereby, meaning that any shape or dimensions may be suitable for water storage 82. More specifically, water W may be held and stored in a water storage interior 84 of water storage 82. Water storage 82 may also include a water storage top opening 86 adapted to allow access to water storage interior 84 should there be a need to make repairs to components housed therein. Otherwise, water storage top opening 86 may be sealed or closed by a water storage lid 88. Located in water storage interior 84 may be a water flush 92. Water flush 92 connects to a hose connector 96. A hose 94 may then be attached to hose connector 96. Water W from a water supply is then sent through hose 94 and into hose connector 96 which then runs water W through water flush 92. Water flush 92 then dispenses water W to fill water storage interior 84. Water W held in water storage interior 84 is dispensed into a water bowl 98 through at least one water dispensing hole 90. Water W in water bowl 98 is maintained at a predetermined level. Once water flush 92 detects that water W has fallen below a predetermined level or threshold more water W is dispensed through at least one water dispensing hole 90 and into water bowl 98. Water bowl 98 may include water bowl sidewalls 100 and a water bowl bottom surface 102. Water bowl 98 may have an open top in order to permit a pet to drink water W therefrom. Water bowl sidewalls 100 may extend upwardly from water bowl bottom surface 102. It should be understood that water bowl 98 may be of a predetermined shape and dimensions. Any shape or dimensions may be suitable for water bowl 98. Any material may be suitable for water dispensing assembly 80 such as plastic, metal, aluminum, wood, steel or the like and combinations thereof. Hose connector 96 may importantly include a valve 99. Valve 99 may be actuated to prevent water W from continuing to flow from hose 94. Valve may be pressed to prevent water W from flowing through hose connector 96 and to water flush 92.

Importantly, food and water dispensing system 10 includes draining assembly 110. Draining assembly 110 is important because it helps to avoid an overflow of water W to occur in water bowl 98. This helps to prevent any water damage that may occur if water W were to overflow or overfill water bowl 98. Water damage may occur to the surrounding area of where the food and water dispensing assembly may be located and is costly to repair. The overflow of water W may occur to structural damage to element(s) in water dispensing assembly 80 such as the water flush 92, for example. Draining assembly 110 may preferably be located inside of water bowl 98. Draining assembly 110 includes a barrier wall 112 that extends from one of water bowl sidewalls 100 to another of water bowl sidewalls 100 located opposite of one another. Barrier wall 112 can be of various dimensions and shapes depending on the size and shape of water bowl 98. Any shape and size is suitable so long as barrier wall 112 is located therebetween two of water bowl sidewalls 100. It is preferable that barrier wall 112 be of a height less than that of water bowl sidewalls 100. Once water W begins to overflow it will go over barrier wall 112 but not over water bowl sidewalls 100 thereby preventing water W from spilling out from water bowl 98. Barrier wall 112 creates an escape space 114 therein water bowl 98. Typically, while the present invention is functioning properly, escape space 114 is vacant and empty. Water W does not enter escape space 114 unless there is an overfill of water W. The overfill may be due to a structural failure of breakdown of components of the present invention. Escape space 114 may include a water escape opening 116 having a water escape hose 118 received and connected therein. Once water W begins to overfill it begins to flow into escape space 114 and exit through water escape hose 118 to be properly disposed of at a drain, which may be located outside of a residence. Water escape opening 116 may be located anywhere on a sidewall that encloses escape space 114, thereby it may not be optimal nor preferable to have water escape opening 116 be located on barrier wall 112. Water escape opening 116 may be of any dimension and shape that is needed by a user, virtually any shape and size may be suitable for water escape opening 116. Water escape hose 118 may be of any predetermined shape and dimension. Water escape hose 118 may need to connect to a drain at an opposite end. In an alternate embodiment, water escape hose 118 may simply lead to an exterior of a home to dispose of the overflowing water, in such a case water escape hose 118 may include a hose filter 120 at one end. Draining assembly 110 in case of emergency is used to dispose of overflowing water. Overflowing water may begin to fill into escape space 114, however preferably, escape space 114 is never completely filled with overflowing water as the overflowing water is removed from escape space 114 through the use of water escape opening 116 and water escape hose 118. In an alternate embodiment, draining assembly 110 may include a hose opening 122 preferably at the back of the present invention. It may be suitable for hose opening 122 to be located anywhere on the present invention. Hose opening 122 is adapted to guide water escape hose 118 out and away from the present invention.

The present invention may also include a base assembly 140 which may be removably mounted. Base assembly 140 may include a base 142. Base 142 may be of a predetermined shape and dimension. Base 142 may include a frame 144 mounted thereon with the use of fasteners or any other suitable means as known in the art. Frame 144 may include a frame front side 145 and a frame rear side 146. Frame 144 may be adapted to receive and secure the present invention thereon. The present invention may be removably mounted therein frame 144. The present invention may be portable due to the removability from frame 144. Adjacent to frame 144, at each of the corners, may include securing hooks 148. Thereon base 142 may be a surface that is comfortable to pets. It may be suitable for frame 144 to be of a dimension that cooperates with the shape and dimension of the present invention. Frame 144 may be made of a metal, aluminum, plastic or stainless steel may be suitable. Frame 144 may further include frame sidewalls 149 extending on lateral edges of frame 144. Frame sidewalls 149 may extend upwardly from frame 144 a predetermined amount. Frame sidewalls 149 may be L shaped. Frame sidewalls 149 aid in securing the present invention in place. Frame sidewalls 149 may be substantially thicker or wider than side frame front side 145 and frame rear side 146.

The present invention may further include a roof assembly 170 removably mounted thereto base assembly 140. Roof assembly 170 may be collapsible for easy removal and storage thereof. Roof assembly 170 may be adapted to provide shade and shelter underneath to both pets and the present invention. This helps to shield and protect food, water, pets and the present invention from weather elements. Roof assembly 170 may include curved rods 172. In the immediate embodiment of the present invention, four of curved rods 172 are used, but it may be suitable for any other number of curved rods 172 to be used. Curved rods 172 may be secured to securing hooks 148, this secures the curved rods to base assembly 140. Curved rods 172 may extend horizontally from the sides of frame 144 then curve upwardly and curve yet again outwardly and perpendicular to the vertical portion of curved rods 172. Portions of curved roods 172 may be parallel to portions of other curved rods 172 located opposite of one another. Curved rods 172 may be secured to one another with the use of straight rods 174. Straight rods 174 secure two of curved rods 172 which are located opposite of one another, more specifically, opposite of each other in relation to frame 144, but on one same horizontal plane. Thereby meaning a first of straight rods 174 is used to interconnect curved rods 172 located nearest frame front side 145 and a second of of straight rods 174 is used to interconnect curved rods 172 nearest frame rear side 146. Straight rods 174 provide stability to roof assembly 170. Straight rods 174 may be parallel to one another. In the immediate embodiment, there are two of straight rods 174 but it may be suitable for any number of straight rods 174 to be used. Roof assembly 170 may further include short rods 176. Short rods 176 may extend atop and between curved rods 172 which are adjacent to one another to provide additional stability to the present invention. Short rods 176 may be parallel to one another. Additionally, roof assembly 170 may include a support rod 178 that extends between short rods 176 to provide support to a roof cover 180 that may be extended atop of roof assembly 170 with the use of fasteners such as hook and loop straps, screws, buttons, snap buttons or the like as known in the art. It further provides structure to roof cover 180 in order to avoid having roof cover 180 from collapsing. Roof cover 180 may provide shelter or cover to pets from weather elements such as the hot sun, rain or snow. In one embodiment, roof cover 180 may be sloped to have objects or weather elements such as rain or snow roll off from roof cover. In an alternate embodiment, roof cover 180 may be straight and evenly leveled. Roof cover 180 may be made of materials that may have high durability to withstand weather elements. Roof cover 180 may be preferably be made of heat resistant materials to help keep the environment underneath relatively cool. Roof cover 180 may be made of weather resistant material to allow for usage outdoors of the present invention while maintaining durability of the present invention. Extended therebetween two of curved rods 172 may be a fan 182 to provide air for comfort to pets. Fan 182 may be removable mounted to roof assembly 170. Fan 182 may be actuated by a power switch 184 mounted adjacently to fan 182 to turn on and off power to fan 182. Fan 182 may be mounted to a support base 186 which helps to provide stability and storage to fan 182 as it is mounted to rood assembly 170.

In one embodiment, the present invention may include a reservoir assembly 200 that may be connected to water escape hose 118 to collect and store excess water W. In the case of an emergency indoors, excess water W can be collected instead of flowing freely and causing damage to the surrounding area. Reservoir assembly 200 may include a reservoir tank 202 into which water W flows and is collected within. Water reservoir tank 202 may be mounted on a rear side of the present invention. Water escape hose 118 may lead into reservoir tank 202. In one embodiment, reservoir tank 202 may be rectangular. It should be understood that it may be suitable for reservoir tank 202 to be of predetermined dimensions, shape and materials. Additionally, housed within reservoir tank 202 may be a float 204. Float 204 may be made of materials that float within water W. In one embodiment, float 204 may be spherical in shape. Water reservoir 202 may include a tank opening 206 on one of the tank sidewalls. Tank opening 206 may be an elongated or oblong opening, in one embodiment. Mounted to float 204 may be a float rod 208. Float rod 208 may be mounted to float 204 on one end and extend through tank opening 206 to then be mounted to the rear side of the present invention. Preferably, tank rod 208 may be mounted above of valve 99. Tank rod 208 may be secured to hose connector 96 by a tank attaching member 212. Tank attaching member 212 may be tear drop shaped, in one embodiment. Mounted directly above of valve 99 may be a stopper 214. Stopper 214 may be semicircular, but it should be understood that other shapes and dimensions may be suitable. Initially, stopper 214 is angled when in the resting position. Stopper 214 may be angled or slopped downwardly when mounted adjacently to valve 99. When water W begins to flow into reservoir tank 202 float 204 may begin to rise. The rise of float 204 may cause float rod 208 and stopper 214 to rotate. The rotation of stopper 214 causes valve 99 to be pressed downwardly by stopper 214, thereby stopping the flow of water W to prevent a water overflow or spill. Once stopper 214 has engaged valve 99 the water flow in the present invention may completely cease. Water W collected within reservoir tank 202 may be disposed of manually to allow for water W to flow in the present invention again once the necessary repairs have been made to water flush 92. Tank rod 208 may be mounted to the present invention in a manner that allows for tank rod to rotate away from float 204. There may be a tank base 216 to provide added stability to the present invention.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A food and water dispensing system, comprising:
   a. a housing;
   b. a water dispensing assembly within said housing, said water dispensing assembly having sidewalls defining a space adapted to receive and hold water;
   c. a water draining assembly including a barrier wall having a height less than said sidewalls, said sidewalls include at least one lateral sidewall that is parallel to said barrier wall, an escape space between said barrier wall and one of said at least one lateral sidewall, said escape space having a water escape opening being in fluid communication therewith, said water escape opening configured to allow said water to pass therethrough and escape said housing;
   d. a base assembly including a base with a frame centrally mounted thereon, said frame including frame front side and a frame rear side which extend horizontally and parallel to each other, said frame further including frame sidewalls at lateral sides thereof, said frame sidewalls extending from said frame, said frame side walls being mounted perpendicularly to said frame front side and said frame rear side, said frame sidewalls being parallel to each other, said base assembly further including securing hooks adjacent to said frame sidewalls, said frame sidewalls being L shaped; and
   c. a roof assembly removably mounted to said base, said roof assembly including curved rods received and held by said securing hooks, said curved rods extending upwardly, said curved rods being parallel to each other on a vertical portion thereof, said curved rods nearest said frame front side being parallel to said curved rods nearest said frame rear side, said curved rods extending beyond peripheral bounds of said base, said roof assembly further including straight rods mounted to said curved rods, each of said straight rods connecting two of said curved rods to each other, said roof assembly further including short rods suspended between and atop two of said curved rods located on one same side of said base, said roof assembly also including a support rod centrally mounted on said short rods and extending perpendicularly between said short rods, a roof cover suspended by said curved rods entirely above said housing, said roof cover extended along and supported by said straight rods, said short rods and said support rod.

2. The system of claim 1, including a food dispensing assembly including a food storage having a food storage interior, a food storage slope, a food storage lid, a food storage top opening, and a food storage bottom opening, said food storage interior receives pet food through said food storage top opening with removal of said food storage lid, said food storage slope guides said pet food to said food storage bottom opening leading to a food bowl having food bowl side walls and a food bowl bottom surface, said food bowl side walls extending upwardly from said food bowl bottom surface thereby holding said pet food within said food bowl, a food storage handle mounted to said food storage lid to facilitate removing and replacing of said food storage lid for access and closure of said food storage interior.

3. The system of claim 1, wherein said water dispensing assembly further includes a water storage having a water storage top opening to allow access to a water storage interior to hold said water therein, said water storage interior being covered by a water storage lid mounted to said water storage top opening, said water storage interior further including a water flush, said water flush having a hose connected thereto, said hose having a hose connector to permit attaching of said hose to a water source, said house connector having a valve, said water source providing a constant flow of said water within said water storage interior, said water being dispensed into said space, said space further defined as a water bowl, said water is dispensed through at least one dispensing hole into said water bowl, said water flush regulating a water threshold of said water to ensure that said water threshold within said water bowl remains at said water threshold, upon said water level falling below said water threshold said water bowl is refilled with said water through said at least one dispensing hole, said water threshold being predetermined.

4. The system of claim 1 further including a storage assembly including a drawer located in a drawer slot, said drawer including sidewalls and a drawer bottom surface, said drawer sidewalls extending from said drawer bottom surface, said drawer having a handle at one of said sidewalls being at a front side thereof, said handle facilitating movement of said drawer in and out of said drawer slot with the guidance of rails mounted said sidewalls, said drawer being entirely covered on a top face thereof when said drawer is flushly within said drawer slot by a drawer top portion.

5. The system of claim 1, wherein a water escape hose is mounted to said water escaped opening to guide said water out and away from said housing.

6. The system of claim 5, wherein said water escape hose has a hose filter mounted on a distal end to keep dirt, debris or animals from entering said water escape hose.

7. The system of claim 1, wherein said base assembly includes four of said securing hooks adjacent to said base, two of said securing hooks being on a left side of said base and the remaining two of said securing hooks being a right side of said base.

8. The system of claim 1, wherein said roof cover is sloped.

9. The system of claim 1, wherein said roof cover is made of a heat resistant material.

10. The system of claim 1, wherein said roof assembly includes a fan removably mounted thereto.

11. The system of claim 10, wherein said fan includes a support base for stability when mounted to said roof assembly.

12. The system of claim 10, wherein said fan is mounted to two of said curved rods being on a same side, said fan being mounted between said vertical portion of said curved rods.

13. The system of claim 10 wherein said fan includes a power switch mounted adjacently to said fan, said power switch actuates said fan to turn said on and off.

14. The system of claim 1, wherein said food and water dispensing system is portable.

15. The system of claim 1, wherein said roof assembly is collapsible.

16. The system of claim 3, wherein said system further includes a reservoir assembly, said reservoir including a reservoir tank and having a tank opening on one of tank sidewalls, a float housed within said reservoir tank, a tank rod mounted to said float on one end and extending through said tank opening and towards said housing on an opposite end, said tank rod mounted above said valve, said tank rod having a stopper mounted thereon, said stopper being mounted adjacently and angled against said valve, said float rising when said water fills said reservoir tank causing said tank rod and said stopper to rotate, said stopper rotation causing said valve to be engaged by said stopper and preventing said water to continue to flow from said hose to adapted to prevent an overflow of said water from said water flush when damaged.

17. A food and water dispensing system, comprising:
a. a food dispensing assembly including a food storage having a food storage interior, a food storage slope, a food storage lid, a food storage top opening, a food storage bottom opening, said food storage interior receives pet food therein through said food storage top opening with removal of said food storage lid, said food storage slope guides said pet food to said food storage bottom opening leading to a food bowl having food bowl side walls and a food bowl bottom surface, said food bowl side walls extending upwardly from said food bowl bottom surface thereby holding said pet food within said food bowl;
b. a water dispensing assembly including a water storage having a water storage top opening to allow access to a water storage interior to hold water therein, said water storage interior being covered by a water storage lid mounted on said water storage top opening, said water storage interior further including a water flush, said water flush having a hose connected thereto and said hose having a hose connector to permit attaching of said hose to a water source, said hose connector having a valve, said water source providing a constant flow of said water therein said water storage interior, said water being dispensed into a water bowl having water bowl sidewalls and a water bowl bottom surface, said water bowl sidewalls extending therefrom said water bowl bottom surface, said water is dispensed through at least one dispensing hole into said water bowl, said water flush regulating a water threshold of said water to ensure that said water threshold within said water bowl remains at said water threshold, upon said water level falling below said water threshold said water flows into said water bowl through said at least one dispensing hole, said water threshold being predetermined;
c. a water draining assembly including a barrier wall extending perpendicularly along said water bowl bottom surface and being shorter than said water bowl sidewalls, said barrier wall creating an escape space therebetween said barrier wall and one of said water bowl sidewalls, said water only going into said escape space only if an overfill of said water in said water bowl occurs, said water escaping from said escape space through a water escape opening located on one of said sidewalls, said water ushered through said water escape hole to a water escape hose mounted to said water escape hole, said water escape hose removing excess said water from said water bowl, said water escape hose being mounted through a hose opening located at a rear side of said drawer slot;
d. a storage assembly including a drawer located in a drawer slot mounted therebetween said food dispensing assembly and said water dispensing assembly, said drawer including sidewalls and a drawer bottom surface, said drawer sidewalls extending therefrom said drawer bottom surface, said drawer having a handle at one of said sidewalls being at a front side thereof, said handle facilitating movement of said drawer in and out of said drawer slot with the guidance of rails mounted thereon later said sidewalls, said drawer being entirely covered on a top face thereof when said drawer is flushly within said drawer slot by a drawer top portion extending therebetween said food bowl and said water bowl;

e. a base assembly including a base with a frame centrally mounted thereon, said frame including frame front side and a frame rear side which extend horizontally and parallel to each other, said frame further including a frame sidewalls at lateral sides thereof, said frame sidewalls extending therefrom said frame, said frame side walls being mounted perpendicularly to said frame front side and said frame rear side, said frame sidewalls being parallel to each other, said base assembly further including securing hooks adjacent to said frame sidewalls;

f. a reservoir assembly, said reservoir including a reservoir tank and having a tank opening on one of tank sidewalls, a float housed within said reservoir tank, a tank rod mounted to said float on one end and extending through said tank opening and towards said housing on an opposite end, said tank rod mounted above said valve, said tank rod having a stopper mounted thereon, said stopper being mounted adjacently and angled against said valve, said float rising when said water fills said reservoir tank from said water escape hose causing said tank rod and said stopper to rotate, said stopper rotation causing said valve to be engaged by said stopper and preventing said water to continue to flow from said hose to adapted to prevent an overflow of said water from said water flush when damaged; and g. roof assembly mounted to said base, said roof assembly including curved rods received and held by said securing hooks, said curved rods extending upwardly, said curved rods being parallel to each other on an vertical portion thereof, said curved rods nearest said frame front side being parallel to said curved rods nearest said frame rear side, said curved rods extending beyond peripheral bounds of said base, said roof assembly further including straight rods mounted thereto said curved rods, each of said straight rods connecting two of said curved rods to each other, said roof assembly further including short rods suspended therebetween and atop two of said curved rods located on one same side of said base, said roof assembly also including a support rod centrally mounted on said short rods and extending perpendicularly therebetween said short rods, a roof cover suspended with said curved rods entirely above said food dispensing assembly, said storage assembly, said water dispensing assembly and said base assembly, said roof cover extended along and supported by said straight rods, said short rods and said support rod.

\* \* \* \* \*